United States Patent
Pan et al.

(10) Patent No.: US 9,027,607 B2
(45) Date of Patent: May 12, 2015

(54) PRE-SRESSED INSULATED TUBING

(75) Inventors: Yaoqing Pan, Panjin (CN); Yongning Wu, Panjin (CN); Jinli Zhu, Panjin (CN); Xiaohui Zhang, Panjin (CN); Wei Zhang, Panjin (CN); Zhenyu Xu, Panjin (CN); Zhenyu Jia, Panjin (CN); Ji Chen, Panjin (CN); Yi Wang, Panjin (CN)

(73) Assignee: General Machinery Plant of Liaohe Petroleum Exploration Bureau of CNPC, Panjin, Liaoning Province (CN)

( * ) Notice: Subject to any disclaimer, the term of this patent is extended or adjusted under 35 U.S.C. 154(b) by 722 days.

(21) Appl. No.: 13/345,327

(22) Filed: Jan. 6, 2012

(65) Prior Publication Data

US 2012/0175007 A1    Jul. 12, 2012

(30) Foreign Application Priority Data

Jan. 7, 2011  (CN) .......................... 2011 1 0002466

(51) Int. Cl.
| | |
|---|---|
| *F16L 9/14* | (2006.01) |
| *E21B 17/00* | (2006.01) |
| *F16L 9/04* | (2006.01) |
| *E21B 36/00* | (2006.01) |
| *F16L 59/065* | (2006.01) |

(52) U.S. Cl.
CPC ................. *E21B 17/00* (2013.01); *F16L 9/045* (2013.01); *E21B 36/003* (2013.01); *F16L 59/065* (2013.01)

(58) Field of Classification Search
CPC .................................. F16L 9/045; F16L 11/16
USPC .......................... 138/114, 149, 148, 141–143
See application file for complete search history.

(56) References Cited

U.S. PATENT DOCUMENTS

| | | | | |
|---|---|---|---|---|
| 3,693,665 | A * | 9/1972 | Veerling et al. | 138/149 |
| 4,396,211 | A * | 8/1983 | McStravick et al. | 285/47 |
| 4,415,184 | A * | 11/1983 | Stephenson et al. | 285/47 |
| 4,538,834 | A * | 9/1985 | Brady et al. | 285/10 |
| 4,566,495 | A * | 1/1986 | Baker et al. | 138/149 |
| 4,624,485 | A * | 11/1986 | McStravick et al. | 285/47 |
| 5,183,299 | A * | 2/1993 | Hallerstrom et al. | 285/47 |

* cited by examiner

*Primary Examiner* — Patrick F Brinson
(74) *Attorney, Agent, or Firm* — The Webb Law Firm

(57) ABSTRACT

The present invention relates to a pre-stressed insulated tubing, including an inner tube (3) and an outer tube (2) nested outside of the inner tube (3), and a closed ring cavity is formed between the inner tube (3) and the outer tube (2), wherein an insulated casing (4) is arranged in the closed ring cavity. The pre-stressed insulated tubing of the present invention features high vacuum degree, high thermal insulation level and long working life, and the insulated casing is reusable for cost saving.

11 Claims, 2 Drawing Sheets

PRE-SRESSED INSULATED TUBING

FIELD OF THE INVENTION

The present invention belongs to a field of petroleum machinery technology, relates to a pre-stressed insulated tubing and particularly relates to a pre-stressed insulated tubing used in thermal recovery of heavy oil.

BACKGROUND OF THE INVENTION

In the prior art, a pre-stressed insulated tubing includes an inner tube, an outer tube and an insulating system formed between the inner tube and the outer tube. The following measures are usually used to form the insulating system: first, an outer wall of the inner tube and an inner wall of the outer tube are sandblasted so as to make surfaces of the tube walls smooth, thereby facilitating vacuum pumping; then, the outer wall of the inner tube is wound around with a plurality of layers (usually six layers) of thermal insulation materials or heat preservation materials such as glass wool cloth, aluminium silicate wool, aluminum foil, etc., getter is added into a cavity formed between the inner tube and the outer tube, and normal vacuum pumping is performed to achieve effects of thermal insulation and heat preservation. In the prior art, apparent heat-conduction coefficient of the pre-stressed insulated tubing is usually larger than 0.003 w/m° C., insulating level is D, and vacuum degree is equal to or less than 5 Pa.

With the development of the petroleum extraction technology, heavy oil extraction technologies such as steam huff and puff, steam drive and SAGD (Steam Assisted Gravity Drainage) have been widely used, and they heat oil layers by using steam of high temperature and high degree of dryness, maintain the oil layers at certain pressure, and drive crude oil to producing wells surrounded to be extracted out, so as to make the oil driving efficiency increase progressively and enhance the oil recovery. However, the steam of high temperature and high degree of dryness in the oil extraction technology of steam huff and puff, steam drive and SAGD sets even higher demand on the insulating performance and working life of the pre-stressed insulated tubing. When the existing pre-stressed insulated tubing is used in steam huff and puff, steam drive and SAGD to continuously inject steam by a corresponding steam injection well, since the inner tube and the outer tube of the steam injection well are usually made of carbon steel materials, when they are used under an oil extraction environment of high temperature and high pressure for a long time, hydrogen ions in carbon steel easily drift out to penetrate into the cavity between the inner tube and the outer tube to form hydrogen, which decreases the vacuum degree in the cavity, thereby destroying the insulating system of the pre-stressed insulated tubing and decreasing the insulating performance of the pre-stressed insulated tubing. In addition, since the outer wall of the inner tube of the traditional pre-stressed insulated tubing is wound around with a plurality of layers of glass wool cloth, aluminium silicate wool, aluminum foil etc., the inner and surfaces of these thermal insulation materials or heat preservation materials absorb a large amount of gas, and the gas will release under the traditional vacuum pumping and "contaminate" the vacuum so that a part of harmful gas will remain in the body of the tubing; when the pre-stressed insulated tubing is under high temperature for a long time, the harmful gas will easily destroy the vacuum insulating system, which will shorten the working life of the pre-stressed insulated tubing (the working life of the existing pre-stressed insulated tubing is merely about 2 years) and affect normal production of oil wells.

At the same time, in the process of manufacturing the pre-stressed insulated tubing since workers are required to wind around the outer wall of the inner tube with thermal insulation materials such as glass wool cloth, aluminium silicate wool, aluminum foil etc., not only the labor intensity is large, but also microfiber released from the materials such as glass wool cloth, aluminium silicate wool, aluminum foil and etc. will bring harm to health of human bodies; it is inevitable for human bodies to encounter dust and noise contamination when the inner tube and the outer tube of the pre-stressed insulated tubing are sandblasted.

SUMMARY OF THE INVENTION

Hereinafter, in order to resolve the above-mentioned existing technical problems in the pre-stressed insulated tubing of the prior art, the present invention provides a pre-stressed insulated tubing with higher vacuum degree, higher insulating level and longer working life.

The present invention proposes following technical solutions to solve the technical problems: the pre-stressed insulated tubing includes an inner tube and an outer tube nested outside of the inner tube, and a closed ring cavity is formed between the inner tube and the outer tube, wherein an insulated casing is arranged in the closed ring cavity.

Wherein, the insulated casing includes one piece of single casing or a plurality of pieces of the single casing (that is, one segment of the single casing or more segments of the single casing). If the plurality of pieces of the single casing is used, the pieces of the single casing are plugged one by one to form a whole.

Preferably, the insulated casing includes a plurality of pieces of the single casing in which one piece of the single casing is plugged into another sequentially, the pieces of the single casing are identical in size, one end of each piece of the single casing is provided with a plugging header and the other end thereof is provided with a plugging socket, and the plugging header on any piece of the single casing matches with the plugging socket on another piece of the single casing in shape.

Preferably, the length of each piece of the single casing is in the range of 100-2000 mm.

Preferably, each piece of the single casing includes two layers nested, i.e. an inner concentric tube and an outer concentric tube, the inner concentric tube and the outer concentric tube are connected at ends to form a whole, the inner concentric tube is nested on the inner tube and an internal diameter of the inner concentric tube is larger than or equal to an external diameter of the inner tube, and an external diameter of the outer concentric tube is smaller than or equal to an internal diameter of the outer tube; or each piece of the single casing includes a plurality of the concentric tubes in which one concentric tube is nested within another from interior to exterior, i.e. includes an inner concentric tube, one or more intermediate concentric tubes and an outer concentric tube, the inner concentric tube, the one or more intermediate concentric tubes and the outer concentric tube are connected at ends to form a whole, the inner concentric tube is nested on the inner tube and the internal diameter of the inner concentric tube is larger than or equal to the external diameter of the inner tube, the external diameter of the outer concentric tube is smaller than or equal to the internal diameter of the outer tube.

In each piece of the single casing, the external diameter of the outer concentric tube is smaller than the internal diameter of the outer tube, several bumps are provided on tube walls of the respective concentric tubes, and heights of the bumps are smaller than a distance between the concentric tube on which the bumps exist and the adjacent concentric tube. The purpose of providing the bump is to strengthen stiffness or strength of the insulated casing.

Further preferably, in each piece of the single casing, outer walls of the inner concentric tube and the intermediate concentric tube are wound around with metal foils. The metal foils can be copper foils. The reflection function of the metal foils is used to effectively prevent thermal loss due to thermal radiation, enhance the insulating effect and make the insulating performance of the insulated tubing better.

More preferably, in each piece of the single casing, space between every two adjacent concentric tubes is annular space, and getter is provided in the annular space. The hydrogen and other harmful gas in the casing can be effectively absorbed by adding getter into the respective annular space of the insulated casing.

Preferably, in each piece of the single casing, when the plurality of the concentric tubes are used, the plurality of the concentric tubes are arranged with an identical distance between every two adjacent concentric tubes, and a vacuum furnace is used for vacuum pumping at high temperature for the annular space formed between every two adjacent concentric tubes. Since vacuum pumping is performed in the vacuum furnace, the vacuum degree of the insulated casing is considerably increased (the vacuum degree is equal to or less than 0.1 Pa) compared with the ordinary vacuum pumping in the prior art.

Preferably, in each piece of the single casing, the respective concentric tubes are made from stainless steel materials, so the respective concentric tubes are also referred to as steel tubes. Since the pre-stressed insulated tubing of the present invention does not include a conventional insulating system which is directly formed by the inner tube and the outer tube made of carbon steel, the problem can be avoided completely that the vacuum degree of the insulated casing decreases due to the fact that carbon steel materials produce free hydrogen ions in the working environment.

Preferably, thermal insulation cotton is provided outside of both ends of the insulated casing.

Preferably, the inner tube is pre-extended to connect to the outer tube. Since the pre-stressed insulated tubing operates underground, the inner tube is full of steam at 350° C., which makes the inner tube produce tensile stresses. So by adopting the pre-extending technology (that is, under high temperature, pre-applying certain tensile stresses to the inner tube to make it extend), the inner tube can buffer the applied stress in its subsequent use, thereby ensuring the working reliability of the pre-stressed insulated tubing under high temperature.

Preferably, the pre-stressed insulated tubing further includes a welding loop, one end of the inner tube after being flared is welded to inside of the outer tube and the other end thereof is welded to the inside of the outer tube via the welding loop so that the closed ring cavity is formed between the two connecting ends of the inner tube and the outer tube, and a width of the welding loop is the difference between the internal diameter of the outer tube and the external diameter of the inner tube. Since the welding loop is mainly used for adapting to the difference between tube diameters of the inner tube and the outer tube and adjusting relative positions between the outer tube and the inner tube, the welding loop is also referred to as an adjusting welding loop.

The advantageous effects of the present invention are as follows: the present invention proposes the above-mentioned technical solutions of the pre-stressed insulated tubing, the insulated casing is provided between the inner tube and the outer tube and consists of several concentric tubes (steel tubes), and the annular space between the concentric tubes is vacuumized and added with getter. So compared with the traditional insulated tubing, the vacuum degree of the pre-stressed insulated tubing of the present invention is higher. Except for the outer concentric tube, outer walls of other concentric tubes are wound around with the metal foils, which can enhance the insulating effect and make the insulating performance better (generally, an insulated casing with three concentric tubes can achieve the vacuum degree of not larger than 0.1 Pa, insulating level E and apparent heat-conduction coefficient in the range of 0.006-0.002 w/m° C.), can satisfy special well situations which demand for higher insulating level and less thermal loss, and can prolong the working life of the pre-stressed insulated tubing considerably. In addition, the insulated casing in the pre-stressed insulated tubing of the present invention is reusable, thereby saving cost effectively.

Reference remarks: 1-coupling; 2-outer tube; 3-inner tube; 4-insulated casing; 5-welding loop; 6-bump; 7-welding seam.

DETAILED DESCRIPTION OF EMBODIMENTS

In order to make those skilled in the art better understand the technical solutions of the present invention, a further detailed description is made to a pre-stressed insulated tubing of the present invention in combination with drawings and particular embodiments.

Figure 1:
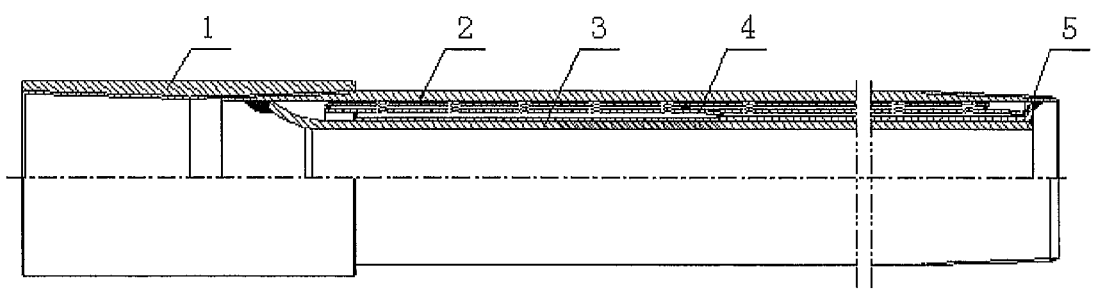
FIG. 1 is a schematic diagram of a structure of a pre-stressed insulated tubing of the present invention.

As shown in FIG. 1, the pre-stressed insulated tubing of the present invention mainly includes an outer tube 2, an inner tube 3, a welding loop 5 and an insulated casing 4. The outer tube 2 is nested outside of the inner tube 3, a closed ring cavity is formed between the inner tube 3 and the outer tube 2, and the insulated casing 4 is arranged in the closed ring cavity.

Wherein, one end of the inner tube 3 is welded to inside of the outer tube 2 after being upset and flared, and after being pre-extended, the other end of the inner tube 3 is welded to the outer tube 2 via the adjusting welding loop 5.

In the present embodiment, the inner tube 3 and the outer tube 2 are both made of carbon steel. Wherein, the inner tube 3 is pre-extended to connect to the outer tube 2. During a process of manufacturing the inner tube 3, according to the principle of "to expand when hot and to shrink when cold" and depending on particular working situations of the pre-stressed insulated tubing, the inner tube 3 is heated in advance under a properly high temperature to make the inner tube 3 expand and extend to conform to conditions of the working situations of the pre-stressed insulated tubing (e.g. conditions such as temperature, depth, pressure, etc.); then, the inner tube 3 contracts under normal temperature, and when the pre-stressed insulated tubing operates under high temperature underground, the inner tube 3 will release pre-applied tensile stresses to compensate for a length difference between the inner tube 3 and the outer tube 2 due to the temperature difference, thereby assuring the working reliability of the pre-stressed insulated tubing under high temperature.

Wherein, the closed ring cavity is formed after the inner tube 3 and the outer tube 2 are welded together. First, one end of the pre-extended inner tube 3 is upset and flared so that a port diameter of the end matches with an internal diameter of the outer tube 2 to connect together by ring welding, that is, the end of the inner tube 3 is welded to the inside of the outer tube 2 to connect together; then, the insulated casing 4 is nested on the inner tube 3, and then the other end of the inner tube 3 is welded to an inner wall of the outer tube 2 to connect together via the welding loop 5 and a welding process is performed after an axial direction is adjusted by the adjusting welding loop 5 so that a width of the welding loop 5 is approximately equal to the difference between an external diameter of the inner tube 3 and the internal diameter of the outer tube 2, so that welding between the inner tube 3 and the outer tube 2 is much tighter and stronger. When both ends of the inner tube 3 are connected to those of the outer tube 2 respectively, the closed ring cavity is formed between the two connecting ends of the inner tube 3 and the outer tube 2.

The insulated casing 4 is provided in the closed ring cavity formed between the two connecting ends of the inner tube 3 and the outer tube 2. The insulated casing 4 includes one piece of single casing or a plurality of pieces of the single casing, and if the plurality of pieces of the single casing is used, one piece of the single casing is plugged into another sequentially to form a whole.

Figure 2:
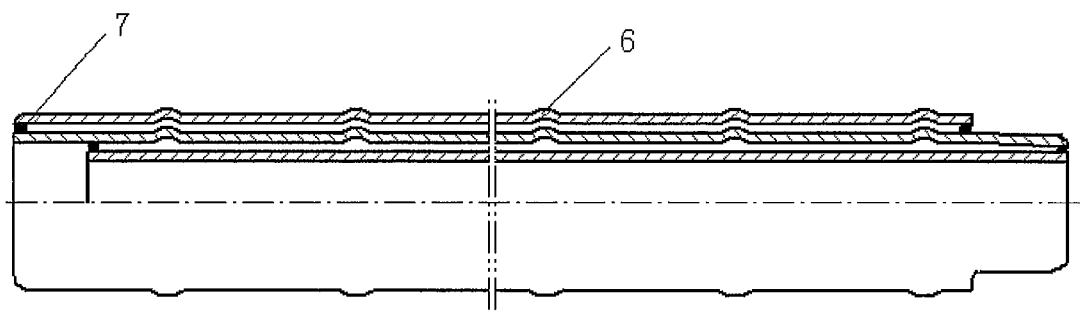
FIG. 2 is a schematic diagram of a structure of one piece of single casing in the FIG. 1.
Figure 3:
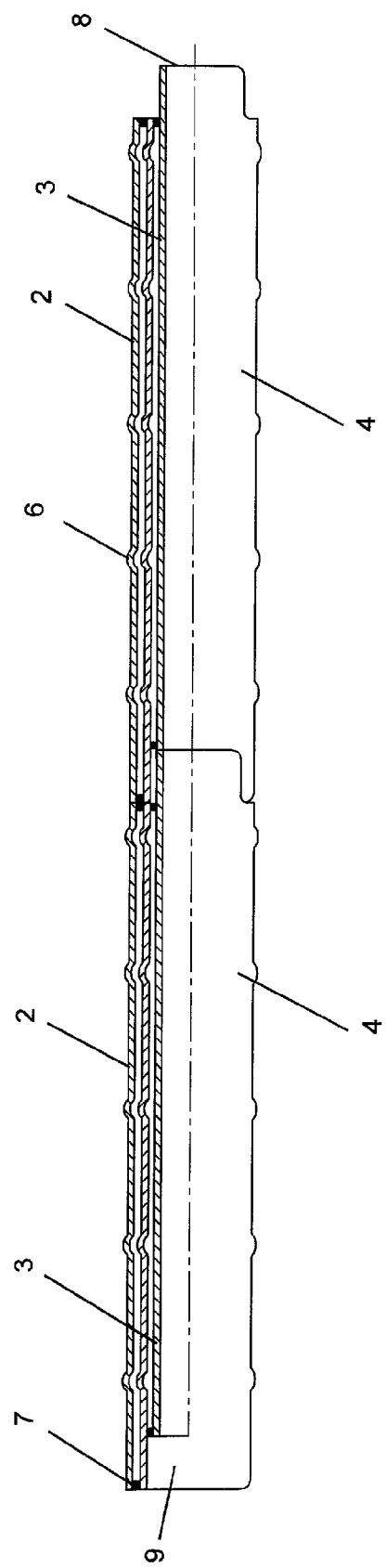
FIG. 3 is a schematic diagram of a structure of a plurality of pieces of the casing in FIG. 1 connected together.

In the present embodiment, a vacuum furnace is used to vacuumize the insulated casing 4 at high pressure. Currently, since space in the vacuum furnace is limited, the length of the insulated casing is also limited (that is, the length of the insulated casing can not be too long). In order to meet length requirements of the vacuum furnace, a plurality of pieces of the single casing with a certain length can be made first, and the pieces of the single casing are all identical in structure and function. FIG. 2 is a schematic diagram of the structure of one piece of the single casing. FIG. 3 is a schematic of the structure of a plurality of pieces of the casing 4 joined together end to end in a sequential manner. One end of each piece of the single casing 4 is set to be a plugging header 8 and the other end thereof is set to be a plugging socket 9, wherein the plugging header 8 of any piece of the single casing 4 matches with the plugging socket 9 of another piece of the single casing 4 in shape. Then, one piece of the single casing is plugged into another and connected to form a whole, as shown in FIG. 3, so as to form the insulated casing with a required length. In practice, the plugging of the pieces of the single casing can flexibly configure the pre-stressed insulated tubing in length as required, however, if the number of pieces of the single casing connected to form the insulated casing is too large, it will increase joints of the insulated casing 4, which will result in that connecting strength between every two adjacent pieces of the single casing in the insulated casing 4 is reduced and at the same time, the insulating effect of the whole pre-stressed insulated tubing is also reduced. In the present embodiment, the length of each piece of the single casing is in the range of 100-2000 mm.

Each piece of the single casing includes two or more concentric tubes in which one of the concentric tubes is nested in another sequentially, and ends of all the concentric tubes are connected together. In the present embodiment, as shown in FIG. 2, the single casing includes three concentric tubes, that is, an inner concentric tube, an intermediate concentric tube and an outer concentric tube. A distance between every two adjacent concentric tubes is configured to be identical (of course, the distance may be configured to be different), the inner concentric tube is nested on the inner tube 3, an internal diameter of the inner concentric tube is larger than the external diameter of the inner tube 3, and an external diameter of the outer concentric tube is smaller than the internal diameter of the outer tube 2. Preferably, central axes of the respective concentric tubes coincide with a central axis of the inner tube 3.

As shown in FIG. 2, in order to strengthen stiffness (or strength) of the insulated casing, several annular bumps 6 spaced at intervals are provided on tube walls of the respective concentric tubes of the insulated casing 4. The bumps 6 are formed on the respective concentric tubes by imprinting or punching, so as to improve load-bearing capacity of the respective concentric tubes within an elastic range. In the present embodiment, a plurality of bumps 6 are provided both on the intermediate concentric tube and the outer concentric tube of the insulated casing, the bumps 6 on the intermediate concentric tube and the outer concentric tube are identical in height, and heights of the bumps are smaller than a distance between the concentric tube on which the bumps are provided and the adjacent concentric tube.

In the present embodiment, the ends of the respective concentric tubes are connected together by welding, and the ends of the respective concentric tubes may be directly welded respectively or may be welded via connecting parts. A welding seam 7 in FIG. 2 is formed when the ends of the respective concentric tubes are directly welded respectively.

The respective concentric tubes are made from stainless steel materials. Since the stainless steel materials are used, the problem of gas "contamination" in carbon steel materials will not exist, and the problem of a decreased vacuum degree will not occur.

In the single casing, except for the outer concentric tube, outer walls of the respective concentric tubes are wound around with a layer of metal foil. The reflection function of the metal foil can effectively prevent thermal loss due to thermal radiation, and enhance the insulating effect and improve the insulating performance. In the present embodiment, copper foil is used as the metal foil.

In the present embodiment, each piece of the single casing includes three concentric tubes. Since space between every two adjacent concentric tubes is annular space, two layers of the annular space are formed among the three concentric tubes. Getter is respectively added into the two layers of the annular space. Then the insulated casing 4 is arranged in the vacuum furnace to vacuumize the annular space. The getter can affectively absorb hydrogen and other harmful gas which are not extracted out from the insulated casing. In the insulated casing 4, the larger the number of the concentric tubes is, the larger the number of the annular space formed between two adjacent concentric tubes is, thus the more obvious the insulating effect is and the better the insulating performance is. It is verified by experiments that three concentric tubes or two layers of the annular space can achieve the highest insulating level (E level) of the pre-stressed insulated tubing.

That is, in the present embodiment, the insulated casing 4 consists of at least three steel tubes, and the ends of the respective steel tubes are welded together, which may be directly welded or welded via connecting parts. At least two layers of the annular space are formed among the steel tubes. The annular space is vacuumized and added with the getter so that the vacuum degree is less than 0.1 Pa. If the number of the steel tubes in the insulated casing 4 is more than three, the number of the annular space formed will be larger. The outer walls of the inner steel tube and the respective intermediate steel tubes are wound around with the metal foil, which increases the insulating effect and make the insulating performance better.

In the present embodiment, when the single casing is manufactured, the outer walls of the inner concentric tube and the intermediate concentric tube with the same length are wound around with the metal foil first, the three concentric tubes are then spaced at a certain interval from each other with their central axes aligned (the central axes of the three concentric tubes are the same with that of the pre-stressed insulated tubing), ends of one side of the three concentric tubes stagger a certain distance one by one in an axial direction to be welded together, the plugging socket is formed at the ends of the one side, and the plugging header is formed at the ends of the other side naturally; at this time, a layer of open annular space is formed between two adjacent concentric tubes, and in the present embodiment, two layers of the annular space are formed in total and bulk getter is added into the annular space to maintain the vacuum degree in the insulated casing; next, the ends of the other side of the three concentric tubes are welded steadily, and at this time, two layers of the closed annular space are formed in the single casing; finally, under a high temperature condition in the vacuum furnace (e.g. 800° C.), the two layers of the annular space are vacuumized via vacuum holes preserved in the single casing (about two hours), then the single casing is finished. However, the pre-stressed insulated tubing in the prior art is manufactured by vacuum pumping directly for the cavity formed between the inner tube and the outer tube under a normal temperature condition in normal factory buildings (about five hours). Compared with the pre-stressed insulated tubing in the prior art, the pre-stressed insulated tubing of the present invention is manufactured by vacuum pumping in the vacuum furnace, the time used for vacuum pumping is shortened, the step of sandblasting an outer wall of the inner tube and an inner wall of the outer tube is eliminated from the process, and the vacuum degree is increased considerably. The vacuum degree of the insulated casing manufactured by using the process is equal to or less than 0.1 Pa, the insulating level reaches E level, apparent heat-conduction coefficient is in the range of 0.006-0.002 w/m° C.; at the same time, the overall insulating level of the pre-stressed insulated tubing in which the insulating system is constituted by the insulated casing 4 reaches E level, and the overall apparent heat-conduction coefficient thereof is in the range of 0.006-0.002 w/m° C.

After manufacture of the insulated casing 4 is finished, the pre-stressed insulated tubing will be manufactured. The process is as follows: first, upsetting and flaring one end of the inner tube 3 to make the port diameter of the one end match with the internal diameter of the outer tube 2, so as to facilitate welding the end of the inner tube into the inside of the outer tube 2 in the subsequent process; next, nesting the insulated casing 4 (formed by one piece or a plurality of pieces of the single casing), which is manufactured in advance and has a proper length, outside of the inner tube 3, and filling thermal insulation cotton outside of two ends of the insulated casing 4 which fixes the position of the insulated casing 4 in the closed ring cavity between the inner tube 3 and the outer tube 2 on one hand and makes the heat preserving effect of the insulated casing 4 better on the other hand; then, nesting the outer tube 2 outside of the insulated casing 4, next based on particular working situations of the pre-stressed insulated tubing (e.g. the working situations such as working temperature, depth, etc, of the pre-stressed insulated tubing), determining the heating temperature when the inner tube 3 is extended thermally, for example 200° C., and then stretching a heating rod inside of the assembled pre-stressed insulated tubing to preheat the inner tube 3 to extend, that is, the inner tube 3 is applied with a certain tensile stress in advance to extend; adjusting relative positions of the inner tube 3 and the outer tube 2 in the axial direction; next, welding the flared end of the inner tube 3 to the outer tube 2 together by ring welding, and then welding the other end of the inner tube 3 which is not flared to the outer tube 2 via the welding loop 5.

In the present embodiment, screw threads are provided on outer surfaces of two ends of the outer tube 2. As shown in FIG. 1, when the pre-stressed insulated tubing of the present embodiment is used for heavy oil extraction technology such as steam huff and puff, steam drive and SAGD, couplings 1 are used to connect a plurality of pieces of the pre-stressed insulated tubing (each piece of the pre-stressed insulated tubing is about 10 m) so as to form a tube column for oil wells. When connecting, ends of the pre-stressed insulated tubing are connected to inner walls of the couplings by using screw threads, and ends of the couplings are connected to the pre-stressed insulated tubing by using API standard screw threads with identical screws and identical pitches (Tubing Joints EU and NU, Buttress Thread Coupling BC, Long Round Thread Coupling LC etc.).

In the present embodiment, the insulated casing 4 is nested in the ring cavity between the inner tube 3 and the outer tube 2 instead of welding connection, so that the insulated casing 4 is reusable to save cost.

Compared with the traditional pre-stressed insulated tubing, in manufacturing the pre-stressed insulated tubing in the present embodiment, processes such as winding the thermal insulation materials around the outer wall of the inner tube, sandblasting the inner wall of the outer tube and the outer wall of the inner tube, etc. are eliminated, so the labor intensity and injury suffered by workers are decreased; the vacuum degree of the manufactured pre-stressed insulated tubing is higher and the insulating performance is better, which can meet requirements of special well situations and prolong the working life from 2 years of the traditional pre-stressed insulated tubing to 7-9 years.

It should be understood that the above embodiments are exemplary embodiments only used for illustrating the principle of the present invention. However, the present invention is not limited to it. Those skilled in the art can make various modifications and variations to the present invention without departing from the principle of the present invention. These modifications and variations are intended to be included within the protection scope of the present invention.

The invention claimed is:

1. A pre-stressed insulated tubing, comprising an inner tube and an outer tube nested outside the inner tube, a closed ring cavity formed between the inner tube and the outer tube, and an insulated casing is arranged in the closed ring cavity,
   wherein the insulated casing includes a plurality of pieces of single casing in which one piece of the single casing is plugged into another sequentially, the pieces of the single casing are identical in size, one end of each piece of the single casing is provided with a plugging header and the other end of each piece of the single casing is provided with a plugging socket, and the plugging header on any piece of the single casing matches with the plugging socket on another piece of the single casing in shape, and
   wherein in the plurality of pieces of the single casing, one piece of the single casing is plugged into another to form a whole.

2. The pre-stressed insulated tubing according to claim 1, wherein a length of each piece of the single casing is in the range of 100-2000 mm.

3. The pre-stressed insulated tubing according to claim 1, wherein each piece of the single casing includes two layers nested, i.e. an inner concentric tube and an outer concentric tube, the inner concentric tube and the outer concentric tube are connected at ends to form a whole, the inner concentric tube is nested on the inner tube, an internal diameter of the inner concentric tube is larger than or equal to an external diameter of the inner tube, and an external diameter of the outer concentric tube is smaller than or equal to an internal diameter of the outer tube; or each piece of the singe casing includes a plurality of the concentric tubes in which one concentric tube is nested within another concentric tube from interior to exterior, i.e. includes an inner concentric tube, one or more intermediate concentric tubes and an outer concentric tube, the inner concentric tube, the one or more intermediate concentric tubes and the outer concentric tube are connected at ends to form a whole, the inner concentric tube is nested on the inner tube, the internal diameter of the inner concentric tube is larger than or equal to the external diameter of the inner tube, and the external diameter of the outer concentric tube is smaller than or equal to the internal diameter of the outer tube.

4. The pre-stressed insulated tubing according to claim 3, wherein in each piece of the single casing, the external diameter of the outer concentric tube is smaller than the internal diameter of the outer tube, several bumps are provided on tube walls of the respective concentric tubes, and the heights of the bumps are smaller than a distance between the concentric tube on which the bumps exist and the adjacent concentric tube.

5. The pre-stressed insulated tubing according to claim 3, wherein in each piece of the single casing, the outer walls of the inner concentric tube and the intermediate concentric tube are wound around with metal foils.

6. The pre-stressed insulated tubing according to claim 3, wherein in each piece of the single casing, the space between every two adjacent concentric tubes is an annular space, and a getter is provided in the annular space.

7. The pre-stressed insulated tubing according to claim 6, wherein in each piece of the single casing, when the plurality of the concentric tubes are used, the plurality of the concentric tubes are arranged with an identical distance between every two adjacent concentric tubes, and a vacuum furnace is used to vacuumize the annular space formed between every two adjacent concentric tubes at high temperature.

8. The pre-stressed insulated tubing according to claim 3, wherein in each piece of the single casing, the respective concentric tubes are made from stainless steel materials.

9. The pre-stressed insulated tubing according to claim 3, further including thermal insulation cotton provided outside of both ends of the insulated casing.

10. The pre-stressed insulated tubing according to claim 3, wherein the inner tube is pre-extended to connect to the outer tube.

11. The pre-stressed insulated tubing according to claim 10, wherein the pre-stressed insulated tubing further includes a welding loop, one end of the inner tube after being flared is welded to inside of the outer tube, the other end thereof is welded to the inside of the outer tube via the welding loop, and a width of the welding loop is a difference between an internal diameter of the outer tube and an external diameter of the inner tube.

* * * * *